July 16, 1929.  C. L. MATTISON  1,721,160
WOOD TURNING MACHINE
Filed June 19, 1925   2 Sheets-Sheet 1
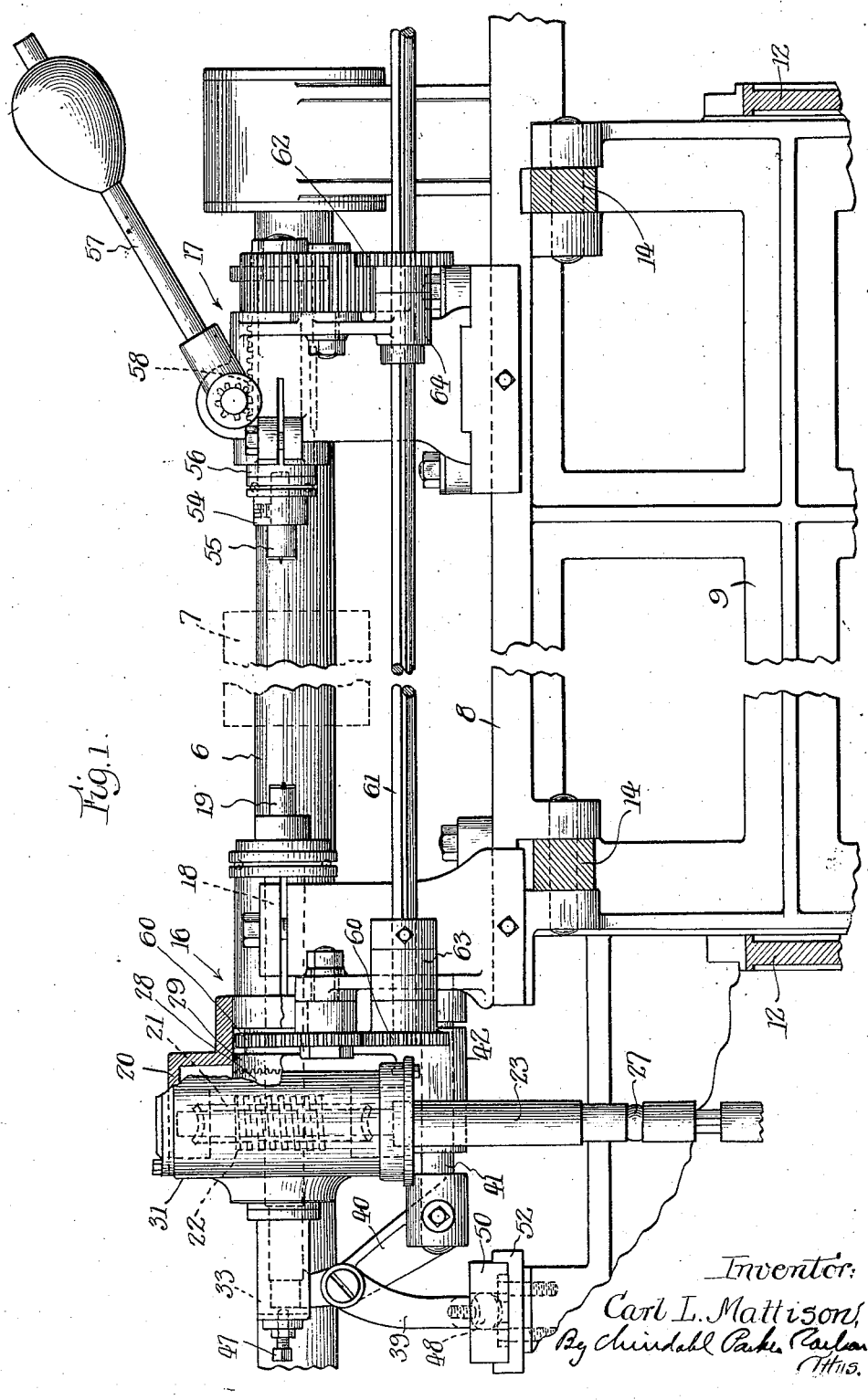

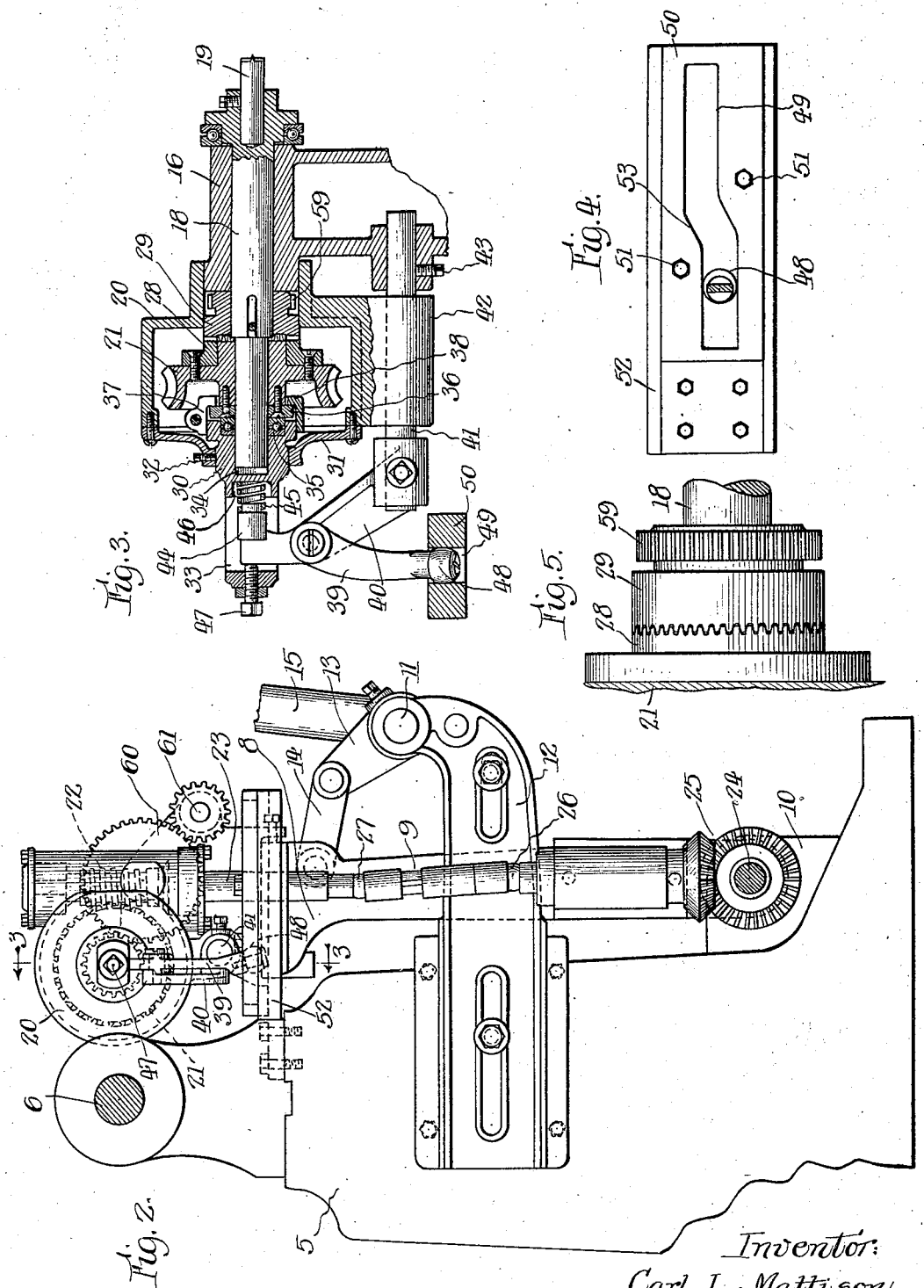

Patented July 16, 1929.

1,721,160

UNITED STATES PATENT OFFICE.

CARL LAWRENCE MATTISON, OF ROCKFORD, ILLINOIS, ASSIGNOR TO MATTISON MACHINE WORKS, OF ROCKFORD, ILLINOIS, A CORPORATION OF ILLINOIS.

WOOD-TURNING MACHINE.

Application filed June 19, 1925. Serial No. 38,220.

The invention relates to improvements in wood-turning machines, and has reference more particularly to improved means for rotating the work in the machine.

In one common type of wood-turning machine the piece to be turned is supported by and between a headstock spindle and a tailstock spindle, the headstock spindle being driven to rotate the work. In some instances the tailstock spindle also is positively driven. The headstock and the tailstock are mounted upon a table which is movable toward and away from the cutter. The drive for the headstock spindle comprises a worm wheel and a continuously driven worm. In order that the piece to be turned may be placed in position between the centers or chucks carried by the spindles, it is necessary to suspend the rotation of the headstock spindle, or of both spindles, if both are positively driven. Means is therefore provided whereby, when the table is moved away from the cutter, the worm is automatically moved out of mesh with the worm wheel, and whereby the worm is returned into mesh with the worm wheel after the piece of work has been placed between and engaged by the centers or chucks carried by the spindles, the re-engagement of the worm occurring in the movement of the table toward the cutter. Such repeated engagement of the worm with the worm wheel causes excessive wear thereof.

To obviate the objections inherent in the above-mentioned method of suspending the rotation of the headstock spindle, I leave the worm and the worm wheel continually in mesh, and provide between the worm wheel and the headstock spindle a clutch of such simple and rugged character as not to be subject to excessive wear or the other objections inherent in the repeated meshing and unmeshing of gear elements.

In the accompanying drawings,

Figure 1 is a fragmentary front elevational view, partially in section, of a wood-turning machine embodying the features of my invention.

Fig. 2 is a fragmentary elevational view of one end of the machine, the driving shaft being shown in section.

Fig. 3 is a fragmentary sectional view taken substantially along line 3—3 of Fig. 2.

Fig. 4 is a plan view of the cam means for operating the drive clutch.

Fig. 5 is a fragmentary detail view of the clutch showing the clutch teeth.

While I have shown in the drawings and will herein describe in detail the preferred embodiment of my invention, it is to be understood that I do not thereby intend to limit the invention to the particular specific form disclosed, but intend to cover all modifications and alternative constructions falling within the spirit and scope of the invention as expressed in the appended claims.

The machine herein shown for purposes of illustration comprises a main frame or base 5 on which is mounted for rotation a cutter spindle 6 upon which is supported a cutter 7 shown diagrammatically in Fig. 1. The work is supported upon a swinging table 8 mounted for movement toward and away from the cutter. The table 8 is carried upon the upper end of an upright frame 9 having its lower end pivotally supported in suitable bearings 10 at the lower forward side of the base.

Means is provided for swinging the table toward and away from the frame 5. This means in the present instance comprises a rock shaft 11 supported a substantial distance forwardly of the frame 5 upon forwardly extending brackets 12 which are secured to the frame so as to be adjustable forwardly and rearwardly relative thereto. A pair of lever arms 13 fast on the rock shaft 11 are pivotally connected by links 14 with the frame 9, and one end of the rock shaft has an operating handle or lever 15 whereby the shaft may be rocked. The arms 13 and the links 14 constitute a pair of toggles for moving the table 8 toward and away from the cutter 7 upon actuation of the rock shaft 11.

Upon the table 8 are supported a headstock 16 and a tailstock 17 adapted to be adjusted in a well known way. The headstock comprises a spindle 18 at the forward end of which is suitably secured a spur center 19. Enclosed within a suitable housing 20 movably mounted on the frame of the headstock 16, is a worm gear 21 loosely mounted on the spindle 18, and a worm 22 meshing with the worm gear. The worm 22 is mounted on a shaft 23 operatively connected at its lower end with a drive shaft 24 through the medium of bevel gearing 25. A pair of universal couplings 26 and 27 are provided in the shaft 23.

Motion is arranged to be transmitted from the worm gear 21 to the spindle 18 through a clutch. The clutch comprises a ring shaped clutch member 28 rigidly secured to one side of the worm gear 21 and a second clutch member 29 secured to the spindle 18, the clutch members being adapted to be moved into and out of engagement by sliding the worm gear along the spindle. The teeth of the clutch members are tapered, as shown in Fig. 5, to prevent looseness. By providing a clutch in the power connection for the spindle, the necessity of separating the worm gear and worm to stop the spindle is obviated, thereby eliminating the excessive wear on these parts which would result from repeated separation and connection.

Means is provided for automatically separating and connecting the clutch members as the table 8 is moved respectively away from and toward the main frame 5. This means comprises a bearing member 30 which extends through the hub of a cap 31 closing the end of the casing 20, and which is adapted to be clamped in the cap by means of a set screw 32. The outer end of the bearing member 30 is formed with a vertical opening 33, and the inner end thereof is formed with a central bore 34 and supports a ball bearing 35 abutting against a ring plate 36 rigidly secured to the hub of the worm wheel 21. The end of the spindle 18 extends slidably through the ball bearing 35 into the bore 34. The worm gear 21 is rotatably secured to the bearing member 30 by means of a retaining ring 37 having a radial flange 38 embracing the ring 36, and being clamped to the inner end of the bearing member.

A lever 39 is mounted on a bracket 40 rigidly secured to a supporting rod 41 which extends through a depending portion 42 of the casing 20, and which is adjustably clamped in the main frame of the headstock 16 by means of a set screw 43. The upper end of the lever 39 is provided with a head 44 engaging a coil spring 45 which is seated in a depression 46 in the bearing member 30 and which tends to move the clutch members 28 and 29 into operative engagement. A stop screw 47 is adjustably threaded through the end of the bearing member 30, and is adapted to be engaged by the upper end of the lever 39 when the latter is operated to move the bearing member, the casing 20 and the worm gear 21 longitudinally of the spindle 18 to disengage the clutch members 28 and 29.

The lower end of the lever 39 is provided with a cam roller 48 which is positioned in engagement with a cam slot 49 in a cam plate 50, and which is movable therein upon movement of the table 8. The cam plate 50 is adjustably clamped by means of bolts 51 in a channel guideway 52 mounted on and extending forwardly of the frame 5. To oscillate the lever 39 in opposite directions as the table 8 is moved from operative position to inoperative position and from inoperative position to operative position, the cam slot 49 is formed with an inclined portion 53 connecting the straight end portions thereof. By moving the lever 39 against the stop screw 47 a positive separation of the clutch members 28 and 29 is effected, and by moving the lever against the spring 45 the latter is compressed and serves to press the clutch members yieldingly together until they snap into engagement.

The tailstock 17 comprises a spindle 54 carrying at its inner end a spur center 55. Herein the spindle 54 is shown as being mounted in the tailstock bearing through the medium of a sleeve 56 which is arranged to be reciprocated to move the spur center 55 toward and away from the center 19 by the operation of a lever 57 having a rack and pinion connection 58 with the sleeve.

To drive the centers 19 and 55 in synchronism, the clutch member 29 is formed with a gear 59 connected through a train of interchangeable gears 60 with a shaft 61 which in turn is connected through a second train of gears 62 with the sleeve 56. The shaft 61 is rotatably but non-slidably mounted in a bracket 63 on the headstock 16, and is slidable in a bracket 64 on the tailstock 17. To permit axial adjustment of the center 19 and 55 relatively to each other, a suitable gear in the train of gears 62 is elongated to permit longitudinal movement of the sleeve 56.

From the above it will be evident that as the table 8 is moved away from the cutter 7, the clutch members 28 and 29 will be automatically disengaged to stop rotation of both centers 19 and 55. The lever 57 is operated to release the finished work and to secure a new piece of work between the work centers. Upon moving the table toward the cutter with the new piece of work the clutch members will be yieldingly pressed together and will snap into operative engagement to start rotation of the work. Movement of the worm gear 21 and worm 22 longitudinally of the spindle 18 is permitted by the universal couplings 26 and 27. By providing a rugged clutch mechanism which is automatically operable to connect and disconnect the drive means for the work, wear on the gears is greatly reduced, and certainty of operation and convenience obtains.

I claim as my invention:

1. A wood-turning machine having, in combination, a main frame having a cutter, a table having a work supporting means, said table being movable to carry the work into and out of engagement with the cutter, a spindle for driving said work supporting means, drive means for said spindle including a worm and worm wheel continually in mesh, said worm wheel being slidably mounted on said spindle, a pair of coacting toothed clutch members mounted respectively on said spindle and said worm wheel, and means automatically operable upon movement of said table to move said worm wheel and the associated clutch member longitudinally of the axis of said spindle positively in a direction to disconnect said drive means and yieldingly in the other direction to connect said drive means.

2. A wood-turning machine having, in combination, a cutter, a table movable toward and from said cutter, work supporting means including a drive spindle on said table, a gear rotatably mounted on said spindle, a pair of clutch members having teeth adapted to coact, said clutch members being secured respectively to said spindle and said gear, a drive shaft having a gear continually in mesh with said first mentioned gear, a housing enclosing said gears and said clutch members, means for automatically shifting said housing and one of said enclosed clutch members when said table is moved away from and toward its operative position next to said cutter, and means for guiding said housing.

3. A wood-turning machine having, in combination, a cutter, a table movable toward and from said cutter, work supporting means including a drive spindle on said table, a worm gear rotatably mounted on said spindle, a clutch having a pair of clutch members with teeth adapted to coact, said members being secured respectively to said spindle and said gear, driving means including a worm meshing with said worm gear, a housing enclosing said worm and worm gear and clutch, said worm gear being rotatably secured to said housing, and means automatically operable to shift said housing longitudinally of said spindle to open and close said clutch upon movement of said table away from and toward its operative position next to said cutter.

4. A wood turning machine having, in combination, a cutter, a table movable toward and from said cutter, work supporting means including a drive spindle on said table, a gear rotatably mounted on said spindle, a clutch having a pair of clutch members adapted to coact, said members being secured respectively to said spindle and said gear, driving means including a gear meshing with said first mentioned gear, a support for one end of said spindle, said second mentioned gear being rotatably secured to said support, and means automatically operable to shift said support axially of said spindle to engage and disengage said clutch members upon movement of said table toward and away from its operative position next to said cutter.

5. A turning machine comprising, in combination, a cutter, a carriage movable toward and from said cutter, work supporting means on said carriage including a rotatably mounted spindle, means to drive said spindle comprising a gear slidable axially on said spindle, a pair of clutch members carried on said gear and spindle, a second gear engaging said first mentioned gear and movable bodily therewith, and means to drive said second mentioned gear including a flexible connection arranged to permit said axial movement of said gears with respect to the spindle.

6. A turning machine comprising, in combination, a main frame, a cutter rotatably mounted thereon, a carriage movable toward and from said cutter, work supporting means on said carriage including a rotatably mounted spindle, means to drive said spindle comprising a worm wheel slidable axially on the spindle, means to couple said worm wheel to the spindle, drive means rotatably mounted on said main frame and means connecting said drive means and said worm wheel arranged to permit of movement of the carriage toward and from the cutter and also movement of said worm wheel axially of the spindle, and means operated by said carriage movement to engage and disengage said coupling means.

In testimony whereof, I have hereunto affixed my signature.

CARL LAWRENCE MATTISON.